Figure 1:
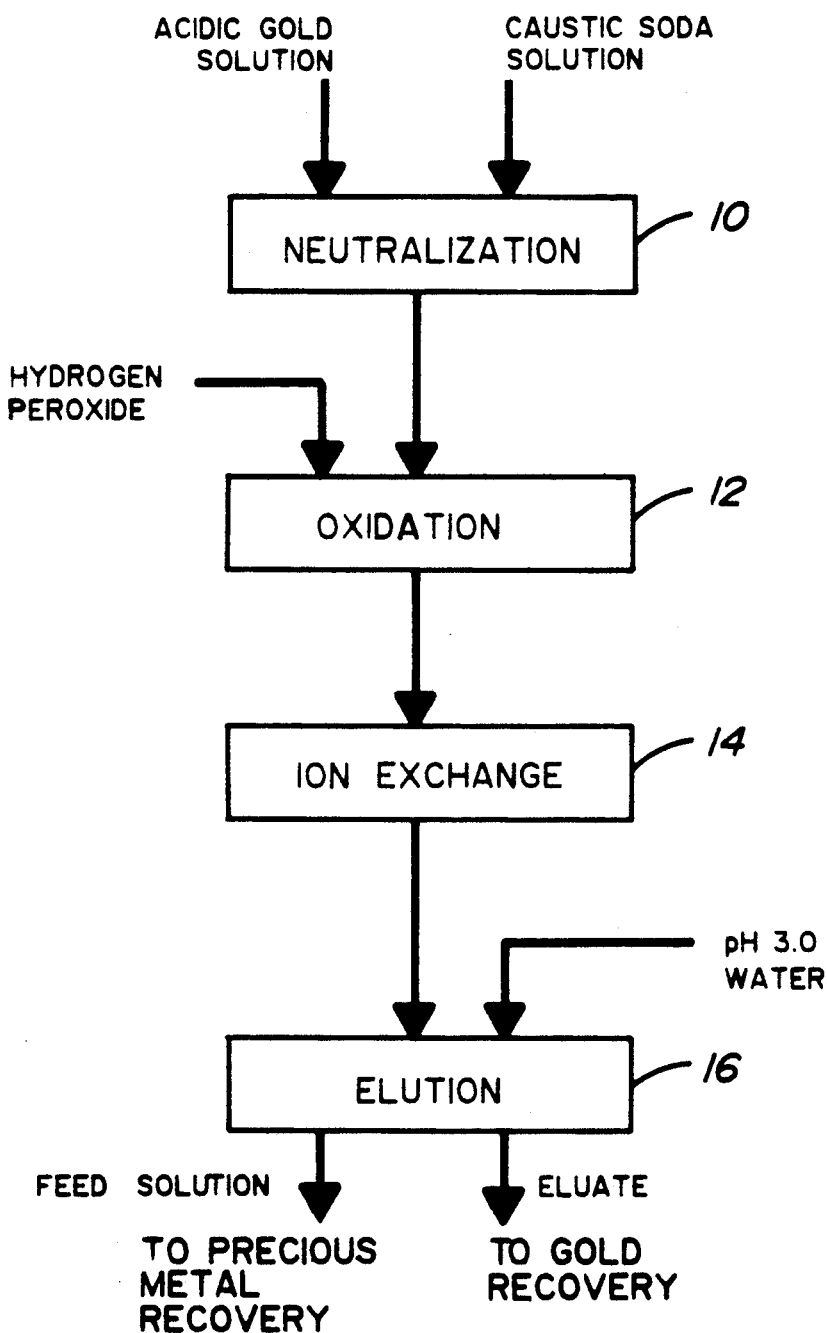

United States Patent [19]

Harris et al.

[11] Patent Number: 5,028,260
[45] Date of Patent: Jul. 2, 1991

[54] RECOVERY OF GOLD FROM ACIDIC SOLUTIONS

[75] Inventors: Bryn G. Harris, Beaconsfield; Jean-Pierre Barry, Montreal; Serge Monette, Longueuil, all of Canada

[73] Assignee: Noranda Inc., Toronto, Canada

[21] Appl. No.: 549,152

[22] Filed: Jul. 6, 1990

[30] Foreign Application Priority Data

Jul. 13, 1989 [CA] Canada .................................. 605544

[51] Int. Cl.$^5$ ........................ C22B 11/06; C22B 11/04
[52] U.S. Cl. ...................................................... 75/736
[58] Field of Search ........................................... 75/736

[56] References Cited

U.S. PATENT DOCUMENTS 4,168,971 9/1979 Szczepanski .......................... 75/736
4,723,998 2/1988 O'Neil ................................... 75/736

Primary Examiner—Peter D. Rosenberg
Attorney, Agent, or Firm—Fleit, Jacobson, Cohn, Price, Holman & Stern

[57] ABSTRACT

A process for recovery of gold from an impure precious and base metal-bearing acidic chloride or mixed chloride/sulphate solution comprises the steps of contacting the acidic solution with a polymeric acrylic ester adsorbent ion exchange resin to selectively adsorb gold, and stripping the gold from the loaded resin by elution with water.

4 Claims, 2 Drawing Sheets

RECOVERY OF GOLD FROM ACIDIC SOLUTIONS

This invention relates to the removal of small amounts of gold from an impure precious and base metal-bearing acidic chloride and mixed chloride-sulphate solution, such as might be encountered in a precious metals refinery.

The recovery of gold from acidic solutions is usually carried out either by classical precipitation procedures involving ferrous sulphate or sulphur dioxide, or more recently by solvent extraction with dibutyl carbitol (DBC) or methyl isobutyl ketone (MIBK). These reagents are effective for the extraction of gold from both dilute and more concentrated feed solutions, but the subsequent recovery of gold from the loaded organic is either into a very weak solution or, more commonly, by reduction of the organic to form metallic gold directly.

Ion exchange processes for the recovery of gold from acidic solutions such as might be found in a precious metals refinery, mostly suffer from the disadvantage that the gold is either irreversibly adsorbed, or that in-situ reduction takes place on the resin. In either case, destruction of the resin is necessary in order to recover the gold, which is a costly process.

One resin, PAZ-2, marketed by SELA Inc., New York, is reported by the manufacturer to be able to adsorb gold from acidic solutions, and to be eluted. However, the eluant solution is a mixture of acetone and concentrated hydrochloric acid, which is not very practical and requires special handling because of the very volatile and inflammable organic component.

Furthermore, small quantities of gold often remain in solution after its prior recovery by precipitation or solvent extraction techniques. When the resultant solution contains, in particular, palladium which is to be recovered by solvent extraction technology using either oximes or dialkyl sulphides as practiced by the major commercial precious metal refiners, it is essential that the gold content of the feed to palladium recovery be reduced to <1 mg/L. This is because palladium is recovered from the loaded organic by stripping with ammonia solutions, which in the presence of both metallic and soluble gold are potentially explosive.

Applicant has surprisingly discovered that the use of a polymeric acrylic ester adsorbent ion-exchange resin is not only highly effective in selectively removing small traces of gold from a precious and base metal-bearing chloride or mixed chloride/sulphate solution, but that the resin can be eluted simply, with no loss of subsequent loading capacity, by the use of water.

The pH of the water is preferably in the range 1-5.

The acidic solution is preferably first neutralized to an acidity less than 100 g/L free acid (pH=0) and then oxidized to ensure that all the gold is in the +3 oxidation state.

Figure 2:
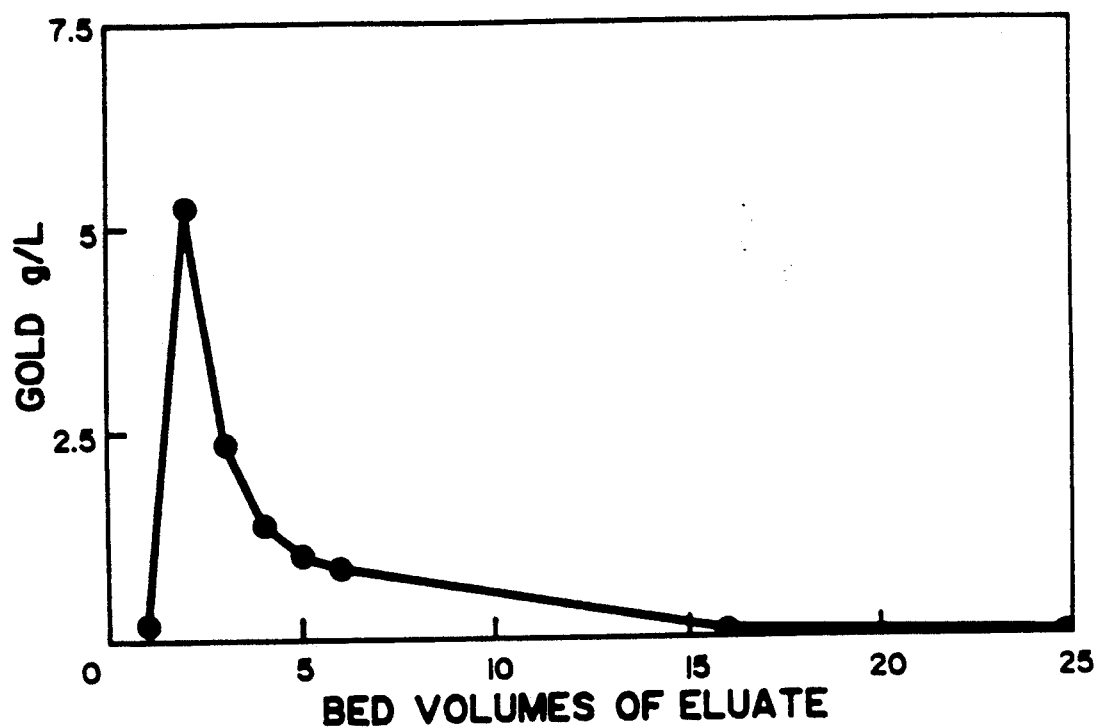

The invention will now be disclosed, by way of example, with reference to the accompanying drawings in which:

FIG. 1 is a schematic of the process; and
FIG. 2 illustrates the elution of gold from the loaded resin.

With reference to the drawing, the acidic gold solution is first neutralized in stage 10 to an acidity of <100 g/L free acid, preferably pH=0, with caustic soda solution, in order to prolong the lifetime of the resin. The degree of neutralization will depend upon the particular application, but over-neutralising will promote the precipitation of metal hydroxides, which is undesirable. Thereafter, the solution is oxidized in stage 12 with hydrogen peroxide, or any suitable oxidising agent, to ensure that the gold is all present in the +3 oxidation state. Failure to ensure this results in incomplete gold removal from solution, as well as some disproportionation to metallic gold from the aurous (+1) state on the resin itself.

The neutralized, oxidized feed solution is then passed in stage 14 through an ion exchange resin, which is an acrylic ester adsorbent, such as Amberlite XAD-7 and XAD-8, supplied by Rohm and Haas Company, wherein the gold is selectively adsorbed by the resin. Other elements such as palladium, platinum, copper, iron, bismuth, rhodium are not adsorbed at all. Depending on feed concentration and the resin chosen, loading capacity is 20–25 g Au/L of resin, from feeds as diverse as 5 mg Au/L up to 300 mg Au/L. It is understood that 300 mg Au/L does not represent an upper limit for effectiveness. It is also to be understood that this invention is not limited to the two acrylic ester type adsorbent resins specified above.

It was surprisingly found that the gold could be quantitatively stripped from the resin by elution with water, as shown in stage 16 and illustrated in FIG. 2. Water in the range pH 1–5 was found to be effective, with higher pH values being more effective. However, a compromise is necessary, since at higher pH values, precipitation in the strip solution occurs, and an optimum pH of 3.0 was determined.

The invention will now be disclosed, by way of example, with reference to the following examples:

EXAMPLE 1

REMOVAL OF GOLD FROM IMPURE FEED SOLUTION

An acidic solution of precious and base metal bearing liquor, assaying 250 mg Au/L, was neutralized with sodium hydroxide solution to pH 0.0. The neutralized solution was then treated with hydrogen peroxide to raise its redox potential to 650 mV (Pt/saturated calomel electrodes). The neutralized, oxidized solution was then passed at a flowrate of 10 bed volume per hour (10 BV/h) through a bed of Amberlite XAD-7, which had been conditioned for 12 hours at pH=0 with hydrochloric acid solution. Table I below shows the results of the test.

TABLE I

| Bed volume Passed | Gold in Exit Solution (mg/L) |
|---|---|
| 20 | <0.39 |
| 40 | 7.39 |
| 60 | 57.2 |
| 80 | 101.0 |

The resin loading obtained in this test was 16.6 g Au/L of resin. No platinum, palladium, rhodium, copper or iron in the feed solution was co-adsorbed.

EXAMPLE 2

REMOVAL OF GOLD FROM IMPURE FEED SOLUTION WITH OTHER RESINS (a) A feed with 31.9 mg Au/L was passed through an ion exchange bed, the resin being an amino-diacetate on a styrene/divinyl benzene co-polymer. No gold was adsorbed.

(b) A feed with 37.4 mg Au/L, having previously been neutralized to pH=0 with caustic soda solution, was passed through ion exchange resin beds containing styrene/divinyl benzene co-polymers, (Amberlite resins XAD-2 and XAD-4). After the passage of about 13-14 bed volumes, a precipitate was noticed to be forming on the resins, which prevented the passage of further solution. The ratio of feed out to feed in gold analysis was 0.04 and 0.05 respectively when flow ceased. Analysis showed the precipitate to be gold, which was being removed from solution.

(c) A precious metal laden solution, containing 23.9 mg Au/L, was passed downflow through an ion exchange bed containing the resin PAZ-2. After the passage of 320 bed volumes, the ratio of gold concentration of the outlet to the inlet was 0.91, and the gold loading on the resin was 1.32 g/L. The gold could not be stripped from the resin by elution with water, dilute hydrochloric acid, concentrated hydrochloric acid or ammonia or thiourea solutions. The recommended method of a mixture containing nine parts acetone and one part concentrated hydrochloric acid was not tested.

(d) The same feed as used in example 2(b) was passed through ion exchange resin beds containing acrylic ester polymeric adsorbents (Amberlite resins XAD-7 and XAD-8). After the passage of 16 bed volumes of feed, the ratio of feed in to feed out gold analysis was 0.008 for XAD-7 and 0.03 for XAD-8. The latter resin differed from the former in that it had a lower degree of polymeric adsorbent. Gold could be recovered from both resins by water elution. XAD-7 is the preferred resin since it is more effective in removing gold from the feed liquor.

EXAMPLE 3

STRIPPING OF THE LOADED RESIN

The resin loaded with gold from Example 1 was then eluted with pH 3.0 water, the pH being adjusted with hydrochloric acid, at a flowrate of 5 BV/h. All testing was conducted at ambient temperature. The results obtained are as shown in FIG. 2, which shows that the second bed volume gives gold of a concentration in excess of 5 g/L. After elution, the resin can be loaded once again.

We claim:

1. A process for recovery of gold from an impure precious and base metal-bearing acidic chloride or mixed chloride/sulphate solution comprising the steps of:
    a) oxidizing the acidic solution to ensure that all the gold therein is in the +3 oxidation state;
    b) contacting the oxidized acidic solution with a polymeric acrylic ester adsorbent ion exchange resin to selectively adsorb gold; and
    c) stripping the gold from the loaded resin by elution with water.

2. A process as defined in claim 1, wherein the acidic solution is first neutralized to an acidity of less than 100 g/L free acid.

3. A process as defined in claim 1, wherein the pH of the water is in the range 1-5.

4. A process as defined in claim 1, wherein the acidic solution is oxidized by adding hydrogen peroxide thereto as an oxidizing agent.

* * * * *